(12) United States Patent
Katsuyama et al.

(10) Patent No.: US 8,913,117 B2
(45) Date of Patent: Dec. 16, 2014

(54) IMAGE PROCESSING APPARATUS AND IMAGE PROCESSING METHOD

(75) Inventors: Yutaka Katsuyama, Kawasaki (JP); Akihiro Minagawa, Kawasaki (JP); Yoshinobu Hotta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 387 days.

(21) Appl. No.: 13/541,228

(22) Filed: Jul. 3, 2012

(65) Prior Publication Data
US 2013/0044197 A1 Feb. 21, 2013

(30) Foreign Application Priority Data
Aug. 19, 2011 (JP) ................. 2011-179969

(51) Int. Cl.
*G06K 9/00* (2006.01)
*G06F 3/042* (2006.01)
*G06F 3/01* (2006.01)
*G06T 7/20* (2006.01)
*G06K 9/52* (2006.01)

(52) U.S. Cl.
CPC .............. *G06F 3/0425* (2013.01); *G06F 3/017* (2013.01); *G06K 9/00355* (2013.01); *G06T 7/2053* (2013.01); *G06K 9/525* (2013.01); *G06T 2207/30196* (2013.01)
USPC .......................................................... 348/77

(58) Field of Classification Search
USPC .......................................................... 348/77
See application file for complete search history.

(56) References Cited

U.S. PATENT DOCUMENTS 8,582,037 B2 * 11/2013 Stern et al. .................... 348/734

FOREIGN PATENT DOCUMENTS

JP    2011-076255    4/2011

* cited by examiner

*Primary Examiner* — Sath V Perungavoor
*Assistant Examiner* — Jeffery Williams
(74) *Attorney, Agent, or Firm* — Fujitsu Patent Center

(57) ABSTRACT

An image processing apparatus 10 acquires an image. And, the image processing apparatus 10 extracts a domain characterizing an object of gesture recognition from the acquired image. Then, the image processing apparatus 10 maps domains between frames of the image. And then, the image processing apparatus 10 extracts a moving direction of the domains. And then, the image processing apparatus 10 outputs the moving direction when a moving distance of the domains is greater than a predetermined threshold. And then, the image processing apparatus 10 updates the threshold using a moving distance exceeding the threshold.

7 Claims, 5 Drawing Sheets

IMAGE PROCESSING APPARATUS AND IMAGE PROCESSING METHOD

CROSS-REFERENCE TO RELATED APPLICATION

This application is based upon and claims the benefit of priority of the prior Japanese Patent Application No. 2011-179969, filed on Aug. 19, 2011, the entire contents of which are incorporated herein by reference.

FIELD

The embodiments discussed herein are directed to an image processing apparatus, an image processing method, and an image processing program.

BACKGROUND

There has been attempted to use a human motion with the body or hand(s), i.e., a so-called gesture in a man-machine interface. As an example of technologies for such gesture recognition, there is a gesture recognition apparatus that recognizes a gesture using a movement locus of an object.

This gesture recognition apparatus extracts an attention point from an object domain corresponding to a user's hand extracted from a plurality of image frames taken at different times. Then, the gesture recognition apparatus determines a moving direction of the object domain on the basis of a moving direction of the extracted attention point, and detects a movement locus of the user's hand using transition data obtained by lining up results of the determination of the moving direction in chronological order.

[Patent document 1] Japanese Laid-open Patent Publication No. 2011-76255

However, the above-mentioned conventional technology has a problem that a motion that a user does not intend is incorrectly recognized as a gesture as will be described below.

Namely, when a user repeatedly makes a gesture, the above gesture recognition apparatus may incorrectly recognize a preliminary action for repeating the gesture as a gesture. For example, when the user repeatedly makes a gesture of moving his hand from right to left, it is not only the user's intended motion of moving his hand from right to left that is recognized as a gesture. That is to say, a preliminary action of moving the hand, which has moved to left, back to right to make the next gesture may also be recognized as a gesture.

SUMMARY

According to an aspect of an embodiment of the invention, a An image processing apparatus includes: an image acquiring unit that acquires an image; a domain extracting unit that extracts a domain characterizing an object of gesture recognition from the image acquired by the image acquiring unit; a mapping unit that maps domains extracted by the domain extracting unit between frames of the image; a direction extracting unit that extracts a moving direction of the domains mapped by the mapping unit;

a direction output unit that outputs the moving direction extracted by the direction extracting unit when a moving distance of the domains mapped by the mapping unit is greater than a predetermined threshold; and a threshold updating unit that updates the threshold using a moving distance exceeding the threshold.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. Incidentally, the embodiments do not limit the technical advantages of the invention. Furthermore, the embodiments can be arbitrarily combined within a scope which does not produce conflicting processing contents.

[a] First Embodiment

Configuration of Image Processing Apparatus

Figure 1:
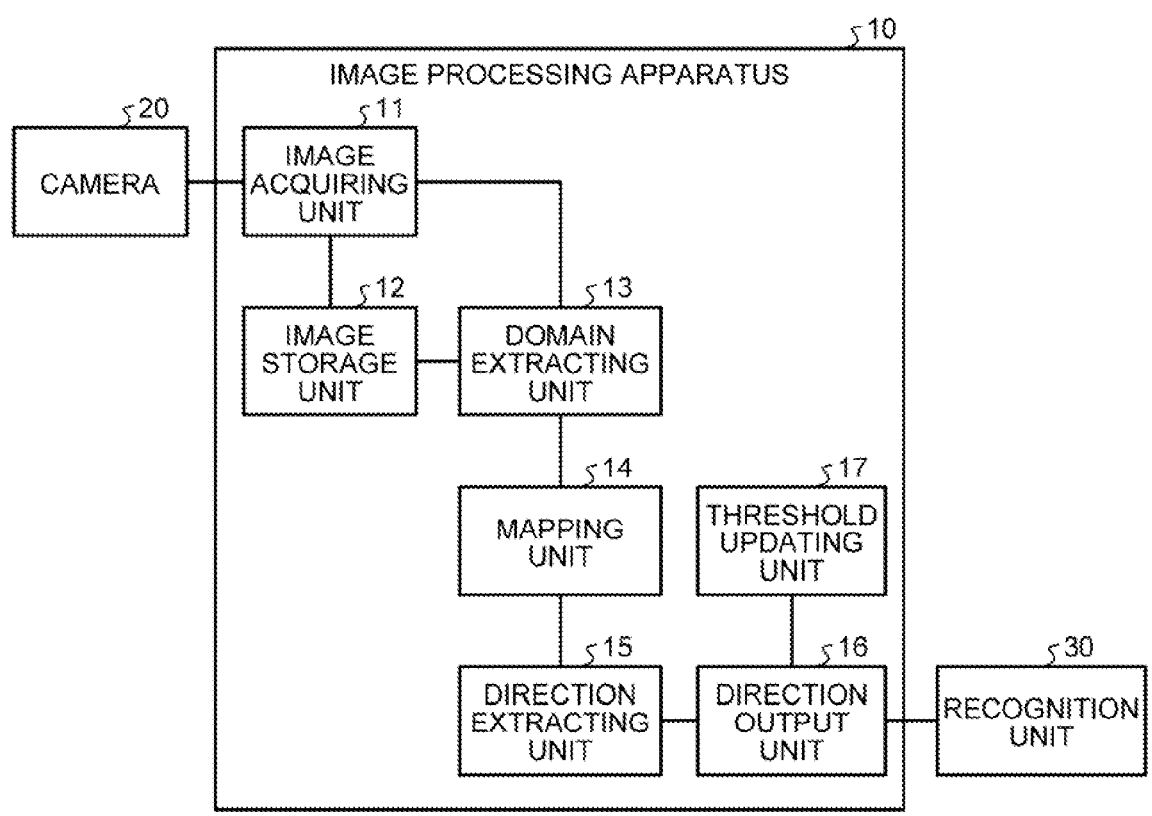
FIG. 1 is a block diagram illustrating a functional configuration of an image processing apparatus according to a first embodiment.

First, a functional configuration of an image processing apparatus according to a first embodiment is explained. FIG. 1 is a block diagram illustrating the functional configuration of the image processing apparatus according to the first embodiment. An image processing apparatus 10 illustrated in FIG. 1 recognizes a human motion with the body or hand(s), i.e., a so-called gesture from an image taken with a camera 20.

The camera 20 illustrated in FIG. 1 is set up so as to take an image in the same direction as the obverse side of a display unit (not illustrated) on which a screen is displayed. Occasionally, a user opposed to the obverse side of the display unit may appear in some of images temporally taken with this camera 20. And, the images in which the user appears may include images taking that the user makes a gesture toward the camera 20. The images taken with the camera 20 are input to the image processing apparatus 10.

As illustrated in FIG. 1, the image processing apparatus 10 includes an image acquiring unit 11, an image storage unit 12, a domain extracting unit 13, a mapping unit 14, a direction extracting unit 15, a direction output unit 16, and a threshold updating unit 17. Incidentally, the image processing apparatus 10 can further include various functional units that a known computer has, such as various input devices, a voice output device, and a communication interface for controlling communication with another apparatus, in addition to the functional units illustrated in FIG. 1.

The image acquiring:unit 11 is a processing unit that acquires an image. As a form of processing, the image acquiring unit 11 sequentially acquires images taken with the camera 20. As another form of processing, the image acquiring unit 11 can acquire an image through a network, such as the Internet or a local area network (LAN). As still another form of processing, the image acquiring unit 11 can acquire an image from a recording medium, such as a memory card or a universal serial bus (USB) flash drive. Incidentally, in what follows, an image that has been acquired through various acquisition means including the camera 20 and has not yet been processed by a subsequent processing unit may be referred to as an "original image".

The image storage unit 12 is a storage unit for storing therein an image. For example, an original image acquired by the image acquiring unit 11 is accumulated and registered in the image storage unit 12. Furthermore, in addition to the original image acquired by the image acquiring unit 11, information on a label subjected to a threshold process or a labeling process by the domain extracting unit 13 to be described below is also registered in the image storage unit 12.

The domain extracting unit 13 is a processing unit that extracts a domain characterizing an object of gesture recognition from an image acquired by the image acquiring unit 11. As a form of processing, the domain extracting unit 13 performs the threshold process or the labeling process on an original image of a frame t acquired by the image acquiring unit 11: Hereby, the domain extracting unit 13 extracts a domain composed of a set of skin color pixels characterizing the hand of a user who makes a gesture as a "label".

To explain about this, the domain extracting unit 13 binarizes an original image with a threshold, which is calculated on the basis of respective matching degrees of a contour and an edge as measures of evaluation, in increasing order of concentration of the original image. Since then, the domain extracting unit 13 determines a threshold using the same measures with the exception of an edge portion obtained by the previous threshold, and binarizes an original image with the determined threshold. By recursively repeating this process, a plurality of binary images, which are respectively binarized with the different thresholds, is generated. After that, the domain extracting unit 13 uses each binary image as a mask, and evaluates a matching degree of a gray value of a skin color image domain in the mask, and the area, longitudinal and lateral lengths, and shape of the skin color image domain, thereby selecting one of the binary images including the most hand-like portion.

In this manner, a hand domain is extracted by using binary images binarized with a plurality of different thresholds based on matching degrees of a contour and an edge, so that the hand domain can be extracted even when an original image of the user's hand is taken with the almost skin-colored background.

The mapping unit 14 is a processing unit that maps labels extracted by the domain extracting unit 13 between frames of an image. As a form of processing, the mapping unit 14 determines whether a label of a frame t extracted by the domain extracting unit 13 overlaps with a label of the last frame t−1 stored in the image storage unit 12 on an image. At this time, when the label of the frame t overlaps with the label of the frame t−1, the mapping unit 14 performs a first mapping process using overlap between labels.

To explain about this, the mapping unit 14 generates a "difference image" by subtracting an image of the frame t−1 from an image of the frame t. Furthermore, the mapping unit 14 generates an "overlapping image" by multiplying the image of the frame t by the image of the frame t−1. By performing the labeling process on the difference image and the overlapping image, a label of the difference image and a label of the overlapping image are extracted. In this manner, the mapping unit 14 gets a set of labels of the frame t, a set of labels of the frame t−1, a set of labels of the difference image, and a set of labels of the overlapping image. Incidentally, hereinafter, a label of a difference image may be referred to as a "difference label", and a label of an overlapping image may be referred to as an "overlapping label".

Figure 2:
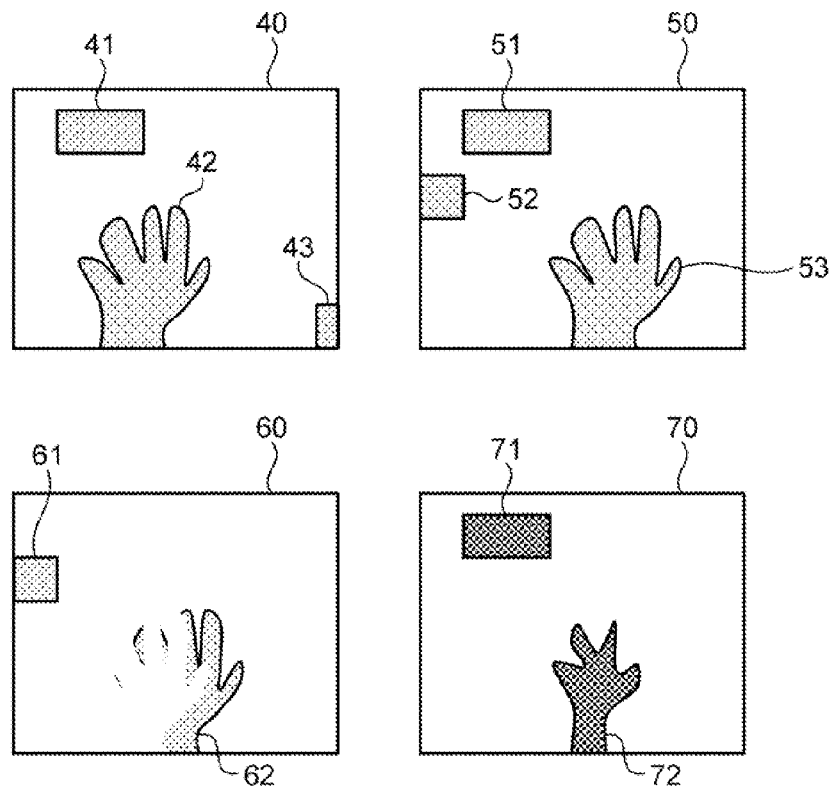
FIG. 2 is a diagram illustrating an example of a frame t−1, a frame t, a difference image, and an overlapping image.

After making such preparations, the mapping unit 14 maps the overlapping label and the difference label to labels of the frames t and t−1. FIG. 2 is a diagram illustrating an example of the frame t−1, the frame t, the difference image, and the overlapping image. A reference numeral 40 illustrated in FIG. 2 indicates a binary image of the frame t−1. A reference numeral 50 illustrated in FIG. 2 indicates a binary image of the frame t. A reference numeral 60 illustrated in FIG. 2 indicates the difference image. A reference numeral 70 illustrated in FIG. 2 indicates the overlapping image.

In the example illustrated in FIG. 2, an overlapping label 71 corresponds to a label 41 of the frame t−1 and a label 51 of the frame t. Furthermore, an overlapping label 72 corresponds to a label 42 of the frame t−1 and a label 53 of the frame t.

Subsequently, the mapping unit 14 uses the following method as a method to map a label La of an image A of a frame t to a label Lb of an image B of a frame t−1. First, the mapping unit 14 calculates the number of overlapping pixels in pixels of the label La of the frame t that overlap with pixels of each label of the frame t−1. Then, the mapping unit 14 maps the label Lb having the largest number of pixels that overlap with those of the label La among the labels of the frame t−1 to the label La. In the example illustrated in FIG. 2, the label 51 of the frame t is mapped to the label 41 of the frame t−1, and the label 53 of the frame t is mapped to the label 42 of the frame t−1.

After a label of the frame t corresponding to a label of the difference image is calculated by using these correspondences, an overlapping label corresponding to the label of the frame t can be derived. In the example illustrated in FIG. 2, a difference label 62, the label 53 of the frame t, and the overlapping label 72 are mapped. The label 53 on the frame t is mapped to the difference label 62 of the difference image, so an object of the label 53 is deemed to be a moving object, and a deemed correspondence between the label 53 on the frame t and the corresponding label 42 on the frame t−1 is selected.

On the other hand, when there is no label of the overlapping image corresponding to any label of the difference image, the object can be deemed to appear/disappear or be a largely-moving object. In this case, the mapping unit 14 performs a second mapping process using moment features (zeroth moment feature: area, second moment feature: principal axis of inertia), thereby determining whether the object is a largely-moving object or has appeared/disappeared. In the example illustrated in FIG. 2, a label 43 of the frame t−1 and a label 52 of the frame t fall into this case. These both have no overlapping label, so objects of these can be presumed to appear/disappear or be a largely-moving object.

To explain about this, the mapping unit 14 calculates a zeroth moment feature, i.e., an area of a label that has no overlapping label or no correspondence with labels of frames using the following equation (1). Incidentally, "$\delta_{ab}$" in the following equation (1) denotes the Kronecker delta. Then, the mapping unit 14 determines whether a divided value obtained by dividing an area of the label 43 of the frame t−1 by an area of the label 52 of the frame t is within a range between a lower limit and an upper limit. Namely, the mapping unit 14 determines whether "(a lower limit L1)<(an area of the label 43 of the frame t−1)/(an area of the label 52 of the frame t)<(an upper limit U1)" is satisfied. As the divided value is closer to "1", the labels 43 and 52 are similar in size. Incidentally, when the divided value is not within the range between the lower limit and the upper limit, the labels can be presumed to differ in size, so the labels 43 and 52 can be deemed to appear or disappear.

$$M00 = S = \Sigma \delta_{Ltarget,L(x,y)}(x)^{\wedge}0 * (y)^{\wedge}0 \quad (1)$$

When the divided value is within the range between the lower limit and the upper limit, the mapping unit 14 calculates a second moment feature, i.e., an amount of moment in a direction of principal axis of inertia and an amount of moment in a direction perpendicular to the principal axis of inertia.

Namely, the mapping unit 14 calculates M10 using the following equation (2), and also calculates M01 using the following equation (3). Then, the mapping unit 14 divides M10 by M00, and divides M01 by M00, thereby calculating a first moment feature, i.e., the position of the center of gravity ($\mu_x$, $\mu_y$). And then, the mapping unit 14 substitutes the calculated position of the center of gravity into the following equations (4) to (6), thereby calculating M20, M02, and M11. After that, the mapping unit 14 transforms the following equation (7) into the following equation (8), and then substitutes M20, M02, and M11 calculated using the equations (4) to (6) into the equation (8), thereby calculating the principal axis θ of inertia. Then, the mapping unit 14 substitutes the principal axis θ of inertia, M02, M11, and M20 into the following equation (9), thereby deriving the second moment around the center of gravity in the direction of the principal axis of inertia. Incidentally, "a^b" in the following equations denotes b-th power of a.

$$M10 = \mu_x = \Sigma \delta_{Ltarget,L(x,y)}(x)^{\wedge}1 * (y)^{\wedge}0 \quad (2)$$

$$M01 = \Sigma \delta_{Ltarget,L(x,y)}(x)^{\wedge}0 * (y)^{\wedge}1 \quad (3)$$

$$M20 = \mu_x = \Sigma \delta_{Ltarget,L(x,y)}(x - \mu_x)^{\wedge}2 * (y - \mu_y)^{\wedge}0 \quad (4)$$

$$M_{02} = \mu_x = \Sigma \delta_{Ltarget,L(x,y)}(x - \mu_x)^{\wedge}0 * (y - \mu_y)^{\wedge}2 \quad (5)$$

$$M11 = \mu_x = \Sigma \delta_{Ltarget,L(x,y)}(x - \mu_x)^{\wedge}1 * (y - \mu_y)^{\wedge}1 \quad (6)$$

$$\tan 2\theta = 2M11/(M20 - M02) \quad (7)$$

$$\theta = \tfrac{1}{2} * \tan-1(2M11/(M20 - M02)) \quad (8)$$

$$M = M20(\cos \theta)^{\wedge}2 + M02(\sin \theta)^{\wedge}2 + M11 \sin 2\theta \quad (9)$$

Then, the mapping unit 14 determines whether a divided value obtained by dividing an amount of moment of the label 52 of the frame t in the direction of principal axis of inertia by an amount of moment of the label 43 of the frame t−1 in the direction of principal axis of inertia is within a range between a lower limit L2 and an upper limit U2. Namely, the mapping unit 14 determines whether "(the lower limit L2)<(an amount of moment of the label 52 of the frame t in the direction of principal axis of inertia)/(an amount of moment of the label 43 of the frame t−1 in the direction of principal axis of inertia)<(the upper limit U2)" is satisfied.

At this time, when the divided value is within the range between the lower limit L2 and the upper limit U2, the mapping unit 14 further makes the following determination. Namely, the mapping unit 14 determines whether a divided value obtained by dividing an amount of moment of the label 52 of the frame t in the direction perpendicular to the principal axis of inertia by an amount of moment of the label 43 of the frame t−1 in the direction perpendicular to the principal axis of inertia is within a range between a lower limit L3 and an upper limit U3.

Namely, the mapping unit 14 determines whether "(the lower limit L3)<(an amount of moment of the label 52 of the frame t in the direction perpendicular to the principal axis of inertia)/(an amount of moment of the label 43 of the frame t−1 in the direction perpendicular to the principal axis of inertia)<(the upper limit U3)" is satisfied.

Here, when the divided value is within the range between the lower limit L3 and the upper limit U3, the label 52 of the frame t and the label 43 of the frame t−1 are similar in not only size but also shape. In this case, the mapping unit 14 determines that the label 43 of the frame t−1 moved to the label 52 of the frame t, and maps the label 52 of the frame t to the label 43 of the frame t−1. On the other hand, when any one of the above three conditions is not satisfied, the mapping unit 14 presumes that it is a noise, and does not map the label 52 to any label. Incidentally, the moment features are invariant with respect to rotation, so the above value becomes "1" when a label rotates properly.

In this manner, determination of the area and shape features is performed on a difference label that does not correspond to any overlapping label by using the zeroth moment feature and the second moment feature, thereby a correspondence between distantly-positioned labels in frames t and t−1 is established with a high degree of accuracy.

The direction extracting unit 15 is a processing unit that extracts a moving direction of labels mapped by the mapping unit 14 in two adjacent frames of an image. As a form of processing, the direction extracting unit 15 calculates the position of the center of gravity of each of labels mapped between frames t and t−1 by the mapping unit 14. Then, the direction extracting unit 15 extracts a direction from the position of the center of gravity of the label of the frame t−1 toward the position of the center of gravity of the label of the frame t as a hand movement direction. Furthermore, the direction extracting unit 15 calculates a distance between the position of the center of gravity of the label of the frame t−1 and the position of the center of gravity of the label of the frame t as a moving distance. Incidentally, when multiple sets of labels are mapped between the frames t and t−1, a statistical value of respective moving distances of the sets, such as an arithmetic average or a weighted average, can be calculated.

The direction output unit 16 is a processing unit that outputs the moving direction extracted by the direction extracting unit 15. As a form of processing, the direction output unit 16 determines whether the moving distance calculated by the direction extracting unit 15 is greater than a threshold updated by the threshold updating unit 17 to be described below. At this time, when the moving distance is greater than the threshold, the direction output unit 16 outputs the hand movement direction extracted by the direction extracting unit 15 to a subsequent recognition unit 30. On the other hand, when the moving distance is not greater than the threshold, the direction output unit 16 does not output the moving direction extracted by the direction extracting unit 15 to the subsequent recognition unit 30.

The threshold updating unit 17 is a processing unit that updates the threshold using a moving distance exceeding the threshold. As a form of processing, when the direction output unit 16 has determined that a moving distance is greater than the threshold, the threshold updating unit 17 sets the moving direction as the threshold used in determination by the direction output unit 16. The reason why the threshold is not fixed and is updated to a moving distance exceeding the threshold as a new threshold in this way is because the speed of moving the hand differs between when a user gestures intentionally and when the user gestures unintentionally. Namely, this is to set the threshold to be far away from the speed of an unintentional hand movement, considering that the speed of moving the hand when the user moves his hand with the intention to gesture is faster than that is when the user unintentionally moves his hand for a preliminary action or the like. On the other hand, when the direction output unit 16 has determined that a moving distance is not greater than the threshold, the threshold updating unit 17 decreases the threshold by multiplying the threshold by a predetermined coefficient smaller than "1", such as 0.8. This is to prevent the threshold from exceeding the speed of moving the hand with the intention to gesture. Incidentally, an initial value of the threshold is set to a value calculated on the basis of the speed sufficient to presume that a user moves his hand with the intention to gesture.

Figure 3:
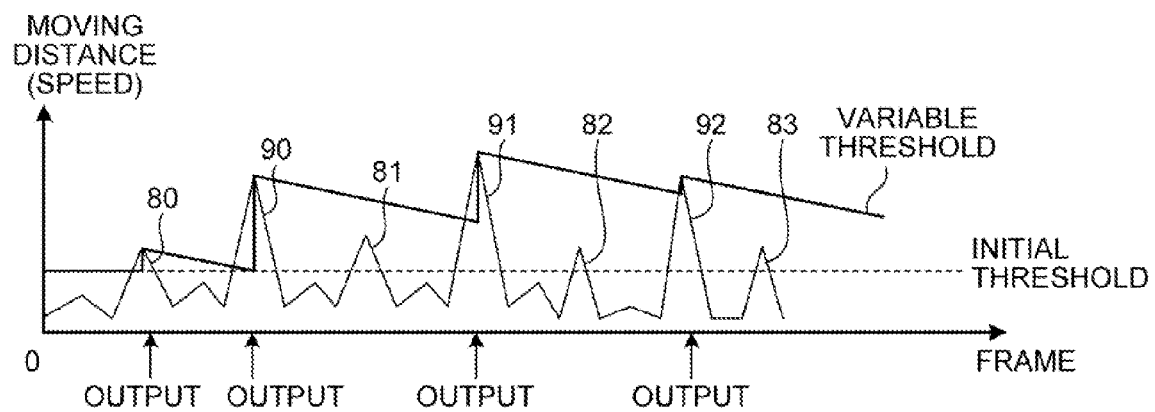
FIG. 3 is a diagram illustrating a correlation between a change in a threshold and a moving distance.

FIG. 3 is a diagram illustrating a correlation between a change in the threshold and a moving distance. Reference numerals 80, 81, 82, and 83 illustrated in FIG. 3 indicate unintentional hand movements when a user repeatedly makes a gesture. Furthermore, reference numerals 90, 91, and 92 illustrated in FIG. 3 indicate intentional hand movements when the user repeatedly makes the gesture.

When an unintentional preliminary action is first made as illustrated in FIG. 3, a hand movement direction is output, so the preliminary action may be incorrectly recognized as a gesture; however, since then, the threshold changes and is far away from a moving distance moved by an unintentional hand movement. Furthermore, a moving distance exceeding the threshold is set as the threshold; therefore, the threshold changes according to user characteristics, so it is possible to meet various patterns of people in such a manner that the threshold is set to high with respect to people who are fast in hand movement and low with respect to people who are slow in hand movement.

Flow of Process

Subsequently, a flow of a process performed by the image processing apparatus according to the present embodiment is explained. Incidentally, here, (1) a hand-movement-direction output process performed by the image processing apparatus 10 will be first explained, and after that, (2) the first mapping process performed as a sub-flow will be explained.

(1) Hand-Movement-Direction Output Process

Figure 4:
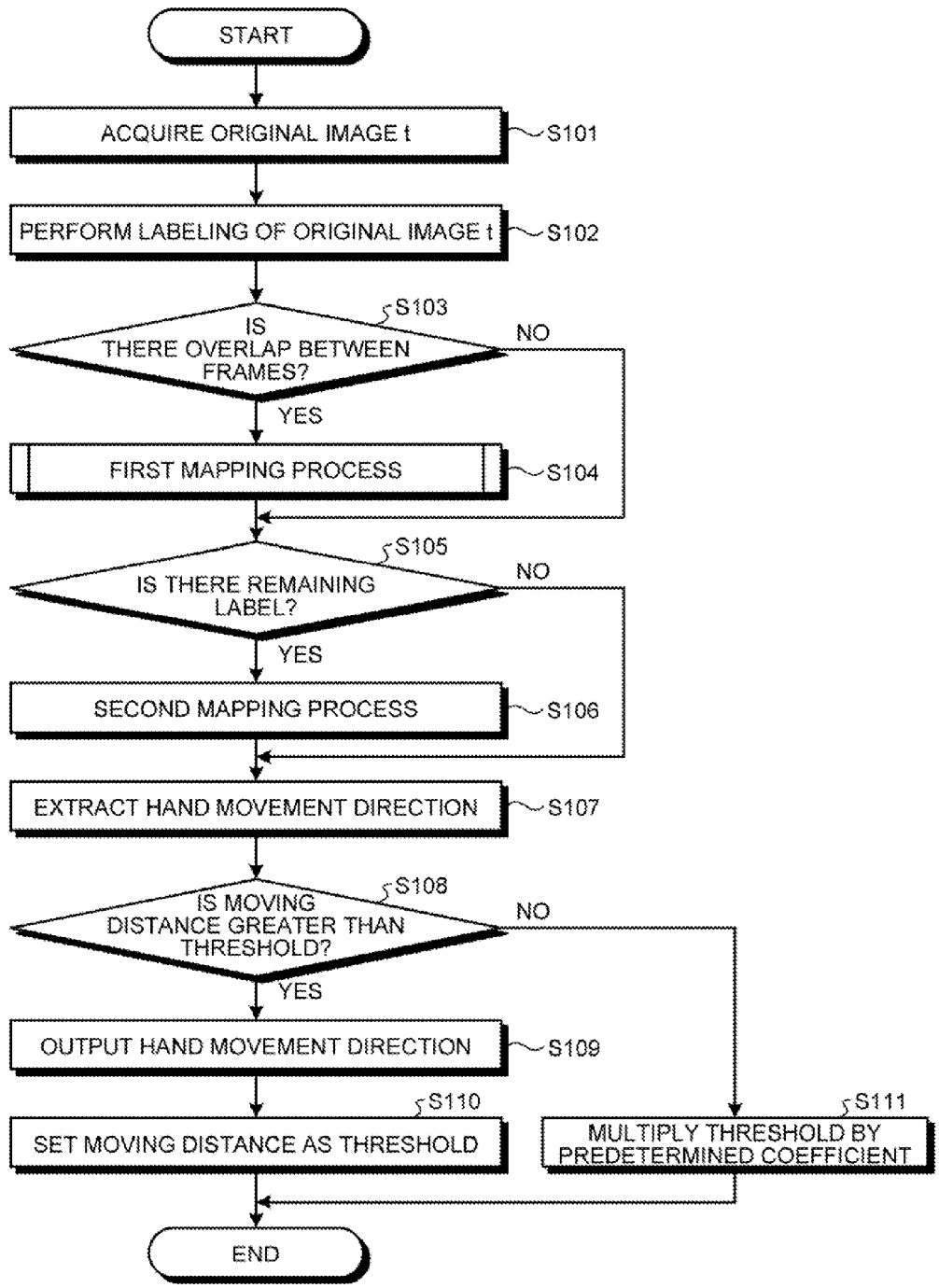
FIG. 4 is a flowchart illustrating a procedure of a hand-movement-direction output process according to the first embodiment.

FIG. 4 is a flowchart illustrating a procedure of the hand-movement-direction output process according to the first embodiment. This hand-movement-direction output process is a repeatedly-performed process as long as the power is ON, and is initiated when an image is acquired from the camera 20.

As illustrated in FIG. 4, the image acquiring unit 11 sequentially acquires an image from the camera 20 (Step S101). Then, the domain extracting unit 13 performs the labeling process on the image acquired by the image acquiring unit 11 (Step S102).

At this time, the mapping unit 14 determines whether a label labeled by the domain extracting unit 13 overlaps with any label labeled in the last frame (Step S103). When there is overlap between the frames (YES at Step S103), the mapping unit 14 performs the first mapping process to be described below on the labels that overlap between the frames (Step S104). Incidentally, when there is no label overlap between the frames (NO at Step S103), the process moves to Step S105.

After that, when there is a label that was not mapped in the first mapping process (YES at Step S105), the mapping unit 14 performs a second mapping process using the zeroth and second moment features (Step S106). Incidentally, when there is no label that was not mapped in the first mapping process (NO at Step S105), the process moves to Step S107.

Then, the direction extracting unit 15 extracts a moving direction of the labels mapped by the mapping unit 14 between the frames (Step S107). After that, the direction output unit 16 determines whether a moving distance is greater than the threshold (Step S108).

At this time, when the moving distance is greater than the threshold (YES at Step S108), the direction output unit 16 outputs the hand movement direction extracted by the direction extracting unit 15 (Step S109). After that, the threshold updating unit 17 sets the moving distance as a threshold used in determination by the direction output unit 16 (Step S110), and the process is ended.

On the other hand, when the moving distance is not greater than the threshold (NO at Step S108), the threshold updating unit 17 decreases the threshold by multiplying the threshold used in determination by the direction output unit 16 by a predetermined coefficient (Step S111), and the process is ended.

First Mapping Process

Figure 5:
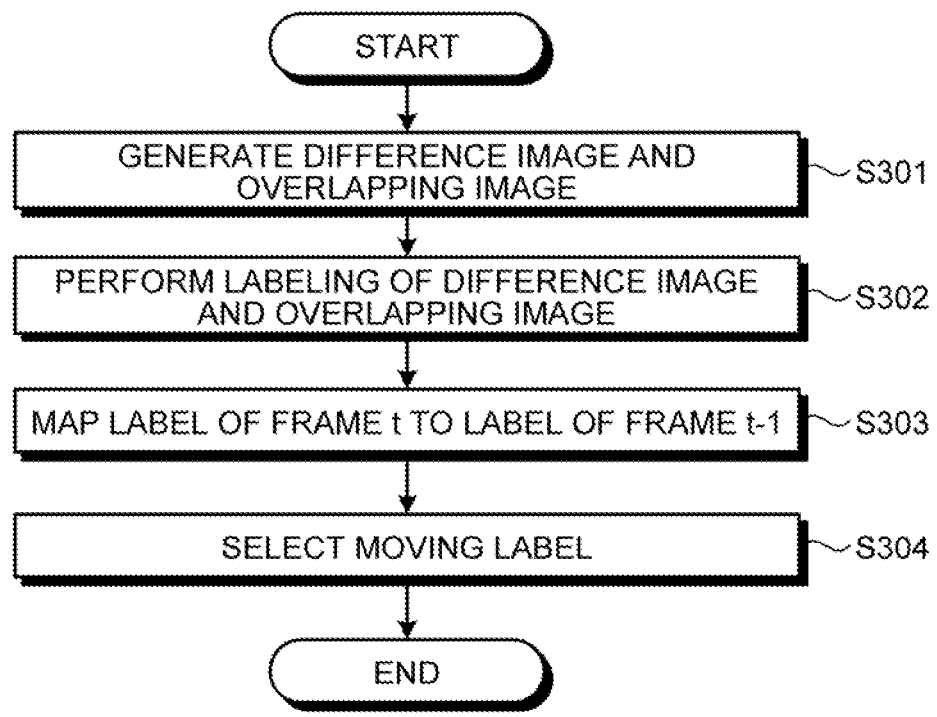
FIG. 5 is a flowchart illustrating a procedure of a first mapping process according to the first embodiment.

FIG. 5 is a flowchart illustrating a procedure of the first mapping process according to the first embodiment. This first mapping process is a process corresponding to Step S104 illustrated in FIG. 4, and is performed on labels that overlap between frames.

As illustrated in FIG. 5, the mapping unit 14 generates a difference image and an overlapping image (Step S301), and performs the labeling process on the difference image and the overlapping image (Step S302). Then, the mapping unit 14 maps a label of a frame t to a label of a frame t−1 on the basis of overlapping labels (Step S303). Last, the mapping unit 14 selects a moving label mapped to a difference label (Step S304), and ends the process.

Effects of First Embodiment

As described above, the image processing apparatus 10 according to the present embodiment extracts a domain characterizing an object of gesture recognition from an image. Furthermore, the image processing apparatus 10 according to the present embodiment maps domains between frames of the image. Moreover, the image processing apparatus 10 according to the present embodiment extracts a moving direction of the domains in two adjacent frames of the image. Furthermore, the image processing apparatus 10 according to the present embodiment outputs the moving direction when a moving distance of the domains in the two adjacent frames of the image is greater than a predetermined threshold. Moreover, the image processing apparatus 10 according to the present embodiment updates the threshold using a moving distance exceeding the threshold.

In this manner, the image processing apparatus 10 according to the present embodiment updates the threshold using a moving distance exceeding the threshold; therefore, the threshold can be set to be far away from the speed of an unintentional hand movement, and as a result, it is possible to prevent a user's unintentional action from being incorrectly recognized as a gesture.

[b] Second Embodiment

The embodiment of the apparatus disclosed herein is explained above; however, besides the above embodiment, the present invention can be implemented in various different forms. Therefore, another embodiment included in the present invention will be explained below.

Application example of updating threshold

For example, in the above first embodiment, there is described an example where a moving distance exceeding the threshold is set as the threshold; alternatively, a moving distance exceeding the threshold can be processed and then set as the threshold. For example, the apparatus disclosed herein can set a median value of the minimum and maximum values of moving distances exceeding the threshold as the threshold, or can set an average value of moving distances exceeding the threshold as the threshold. This enables the threshold to be set to a more appropriate value.

Image Processing Program

Furthermore, the various processes described in the above embodiment can be realized by causing a computer, such as a personal computer or, a workstation, to execute a program prepared in advance. An example of a computer that executes an image processing program having the same functions as in the above embodiment is explained below.

Figure 6:
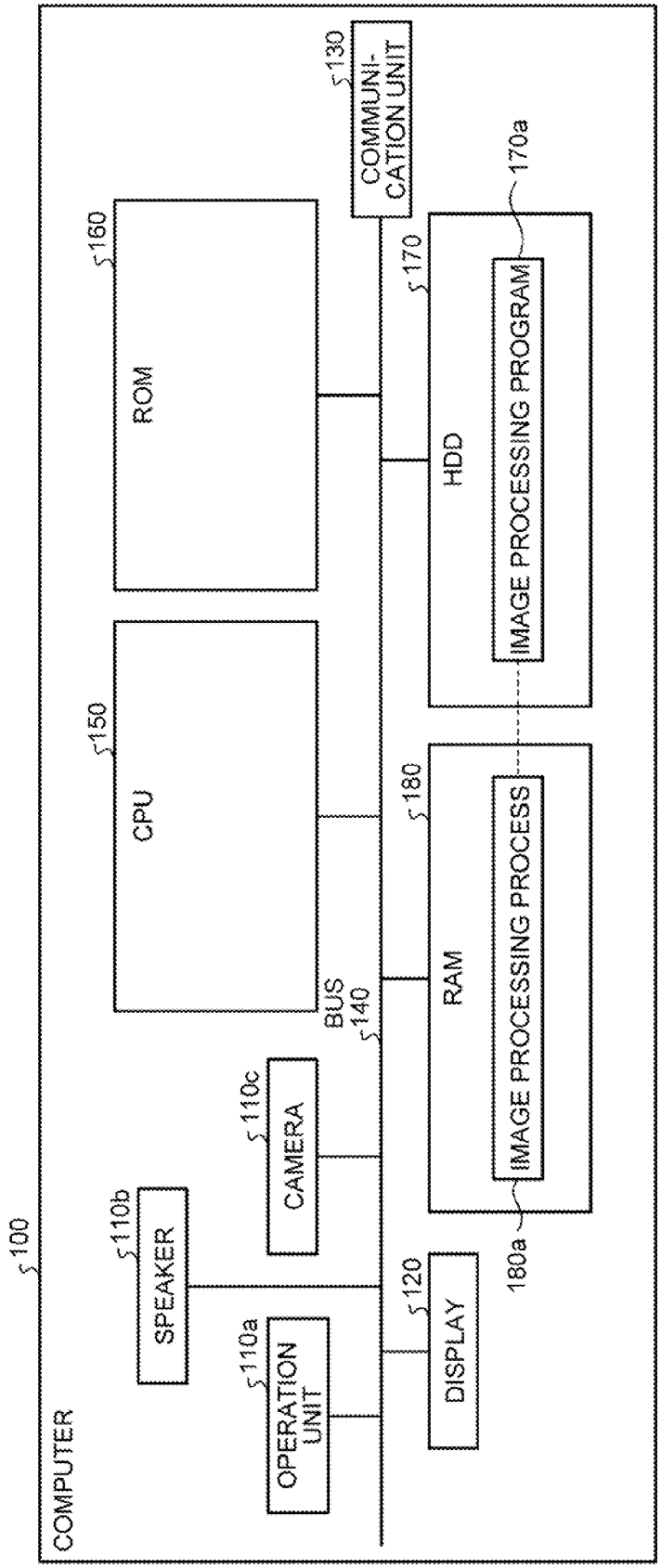
FIG. 6 is a diagram for explaining an example of a computer that executes an image processing program according to the first and second embodiments.

FIG. 6 is a diagram for explaining an example of a computer that executes an image processing program according to the first and second embodiments. As illustrated in FIG. 6, a computer 100 includes an operation unit 110a, a speaker 110b, a camera 110c, a display 120, and a communication unit 130. The computer 100 further includes a CPU 150, a ROM 160, an HDD 170, and a RAM 180. These units 110 to 180 are connected to one another by a bus 140.

As illustrated in FIG. 6, in the HDD 170, an image processing program 170a, which fulfills the same functions as the image acquiring unit 11, the domain extracting unit 13, the mapping unit 14, the direction extracting unit 15, the direction output unit 16, and the threshold updating unit 17 illustrated in the above first embodiment, is stored in advance. In the same manner as the components illustrated in FIG. 1, i.e., the image acquiring unit 11, the domain extracting unit 13, the mapping unit 14, the direction extracting unit 15, the direction output unit 16, and the threshold updating unit 17, the image, processing program 170a can be arbitrarily integrated or separated. Namely, all data stored in the HDD 170 does not always have to be stored in the HDD 170, and a part of data for processes may be stored in the HDD 170.

Then, the CPU 150 reads out the image processing program 170a from the HDD 170 and expands the read image processing program 170a into the RAM 180. Hereby, the image processing program 170a functions as an image processing process 180a as illustrated in FIG. 6. This image processing process 180a causes various data read out from the HDD 170 to be arbitrarily decompressed into an allocated area on the RAM 180, and various processes are performed on the basis of the decompressed data. Incidentally, the image processing process 180a includes the processes performed by the image acquiring unit 11, the domain extracting unit 13, the mapping unit 14, the direction extracting unit 15, the direction output unit 16, and the threshold updating unit 17 illustrated in FIG. 1, such as the processes illustrated in FIGS. 4 and 5. Furthermore, all the processing units virtually realized on the CPU 150 do not always have to operate on the CPU 150, and only the processing unit for the process just has to be virtually realized.

Incidentally, the image processing program 170a does not always have to be stored in the HDD 170 or the ROM 160 from the beginning. For example, the image processing program 170a can be stored in a flexible disk to be inserted into the computer 100, i.e., a "portable physical medium" such as an FD, a CD-ROM, a DVD, a magnet-optical disk, or an IC card. Then, the computer 100 can acquire the image processing program 170a from the portable physical medium and execute the image processing program 170a. Moreover, the image processing program 170a can be stored in another computer or a server connected to the computer 100 via a public line, the Internet, a LAN, a WAN, or the like, and the computer 100 can acquire the image processing program 170a from another computer or the server and execute the image processing program 170a.

According to an aspect of an image processing apparatus disclosed in the present application, it is possible to prevent a user's unintentional motion from being incorrectly recognized as a gesture.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
   an image acquiring unit that acquires an image;
   a domain extracting unit that extracts a domain characterizing an object of gesture recognition from the image acquired by the image acquiring unit;
   a mapping unit that maps domains extracted by the domain extracting unit between frames of the image;
   a direction extracting unit that extracts a moving direction of the domains mapped by the mapping unit;
   a direction output unit that outputs the moving direction extracted by the direction extracting unit when a moving distance of the domains mapped by the mapping unit is greater than a predetermined threshold; and
   a threshold updating unit that updates the threshold using a moving distance exceeding the threshold.

2. The image processing apparatus according to claim 1, wherein the threshold updating unit sets a moving distance exceeding the threshold as the threshold, and decreases the threshold with time until a moving distance of the domains exceeds the threshold.

3. The image processing apparatus according to claim 1, wherein the threshold updating unit sets the threshold using the minimum and maximum values of moving distances exceeding the threshold.

4. The image processing apparatus according to claim 1, wherein the threshold updating unit sets an average value of moving distances exceeding the threshold as the threshold.

5. An image processing method executed by a computer, the image processing method comprising:
   acquiring an image;
   extracting a domain characterizing an object of gesture recognition from the acquired image;
   mapping domains between frames of the image;
   extracting a moving direction of the domains;
   outputting the extracted moving direction when a moving distance of the domains is greater than a predetermined threshold; and
   updating, using a processor, the threshold using a moving distance exceeding the threshold.

6. A non-transitory computer readable storage medium having stored therein a image processing program that causes a computer to execute a process comprising:
   acquiring an image;
   extracting a domain characterizing an object of gesture recognition from the acquired image;
   mapping domains between frames of the image;
   extracting a moving direction of the domains;
   outputting the extracted moving direction when a moving distance of the domains is greater than a predetermined threshold; and updating the threshold using a moving distance exceeding the threshold.

7. An image processing apparatus includes
a processor; and
a memory, wherein the processor executes:
   acquiring an image;
   extracting a domain characterizing an object of gesture recognition from the acquired image;
   mapping domains between frames of the image;
   extracting a moving direction of the domains;
   outputting the extracted moving direction when a moving distance of the domains is greater than a predetermined threshold; and
   updating the threshold using a moving distance exceeding the threshold.

* * * * *